(12) United States Patent
Osmanis et al.

(10) Patent No.: US 10,701,326 B1
(45) Date of Patent: Jun. 30, 2020

(54) IMAGE DISPLAY SYSTEM, METHOD OF OPERATING IMAGE DISPLAY SYSTEM AND IMAGE PROJECTING DEVICE

(71) Applicant: Lightspace Technologies, SIA, Marupe, Marupes novads (LV)

(72) Inventors: Ilmārs Osmanis, Mārupes novads (LV); Krišs Osmanis, Babītes novads (LV); Roberts Zabels, Riga (LV); Mārtiņš Narels, Riga (LV); Uģis Gertners, Riga (LV)

(73) Assignee: Lightspace Technologies, SIA, Marupe, Murpes Novads (LV)

( * ) Notice: Subject to any disclaimer, the term of this patent is extended or adjusted under 35 U.S.C. 154(b) by 0 days.

(21) Appl. No.: 16/507,206

(22) Filed: Jul. 10, 2019

(51) Int. Cl.
| | | |
|---|---|---|
| H04N 9/31 | (2006.01) | |
| G03B 21/14 | (2006.01) | |
| G02B 5/02 | (2006.01) | |
| G02B 30/52 | (2020.01) | |
| H04N 13/302 | (2018.01) | |

(52) U.S. Cl.
CPC ......... *H04N 9/3155* (2013.01); *G02B 5/0278* (2013.01); *G02B 5/0284* (2013.01); *G02B 30/52* (2020.01); *H04N 9/3138* (2013.01); *H04N 9/3161* (2013.01); *H04N 9/3164* (2013.01); *H04N 13/302* (2018.05)

(58) Field of Classification Search
CPC ...... H04N 9/31; H04N 9/3155; H04N 9/3188; H04N 9/3161; H04N 9/3164; H04N 13/00; H04N 13/302; H04N 13/388; G02B 30/26; G02B 30/50; G02B 30/52; G02B 27/0955; G02B 27/30; G03B 21/008; G09G 3/003
See application file for complete search history.

(56) References Cited

U.S. PATENT DOCUMENTS

| | | | | |
|---|---|---|---|---|
| 2001/0013960 | A1* | 8/2001 | Popovich | G02B 30/52 359/15 |
| 2002/0163482 | A1* | 11/2002 | Sullivan | G06T 15/00 345/6 |
| 2006/0181780 | A1* | 8/2006 | Raber | G02B 17/0896 359/676 |
| 2007/0242237 | A1* | 10/2007 | Thomas | H04N 13/365 353/94 |
| 2019/0387220 | A1* | 12/2019 | Osmanis | H04N 9/3111 |
| 2020/0045302 | A1* | 2/2020 | Osmanis | G02B 27/30 |
| 2020/0066194 | A1* | 2/2020 | Osmanis | G09G 3/003 |

* cited by examiner

*Primary Examiner* — William C. Dowling
(74) *Attorney, Agent, or Firm* — Ziegler IP Law Group LLC (57) ABSTRACT

An image display system. The image display system includes an image source for producing an image. The image source includes a plurality of display units arranged in an array and each display unit is configured to emit collimated light for producing a pixel of the image. The image display system includes a volumetric display module including a plurality of optical diffuser elements arranged in a stack. Furthermore, an optical diffuser element of the plurality of optical diffuser elements is maintained in a first state or a second state. The image display system includes a controller operatively coupled to each of the image source and the volumetric display module. The controller is configured to control an optical diffuser element to maintain the optical diffuser element in the second state and the plurality of display units for projecting the image on the optical diffuser element maintained in the second state.

25 Claims, 4 Drawing Sheets

IMAGE DISPLAY SYSTEM, METHOD OF OPERATING IMAGE DISPLAY SYSTEM AND IMAGE PROJECTING DEVICE

TECHNICAL FIELD

The present disclosure relates generally to display systems; and more specifically to image display systems for displaying three-dimensional images. Furthermore, the present disclosure relates to methods of operating such image display systems. Moreover, the present disclosure relates to image projecting devices for producing three-dimensional images.

BACKGROUND

Conventionally, visual multimedia content has always been consumed in two-dimensional format. For example, television display screens present two-dimensional images (or videos) to viewers and computer screens provide graphical information in two-dimensional format to users. However, with improving technology and a consequent need for complex information to be provided to users in simple and easy-to-digest form, consumption of visual multimedia content in three-dimensional formats is growing in popularity. For example, people's preference has shifted from watching movies in two-dimensional formats and in standard definition (SD) to experiencing movies in three-dimensional formats and in high definition (HD) or ultra-high definition (UHD).

However, commercially available technology has generally failed to address a requirement for presenting three-dimensional content to viewers in high-definition. Generally, most technology that aims to present three-dimensional content to viewers is reliant on stereoscopic technology. Such a technology renders a pair of slightly different two-dimensional images on a display screen, such that a visual system of the viewer combines the pair of images and perceives objects presented therein to be three-dimensional in nature. However, such stereoscopic techniques are associated with various drawbacks. For example, stereoscopic techniques enable displaying of objects located at different virtual depths within the presented image at a same actual depth to the viewer, such that the actual depth corresponds to a position of the display screen with respect to eyes of the viewer. Thus, the eyes of the viewer are unable to focus at different points for viewing the objects at different virtual depths, thereby, giving rise to vergence-accommodation conflict. The vergence-accommodation conflict causes discomfort to the viewer in a form of eyestrain, fatigue, nausea, headaches and so forth.

Usually, volumetric display systems attempt to overcome such problems of vergence-accommodation conflict associated with conventional stereoscopic techniques of presenting three-dimensional content to viewers. However, commercially available volumetric display systems are bulky, unsatisfactory and inefficient at displaying high quality three-dimensional images (such as, images having high image resolution and/or sharpness) to viewers.

Therefore, in the light of the foregoing discussion, there exists a need to overcome the aforementioned drawbacks associated with conventional systems and techniques for presenting three-dimensional content to viewers.

SUMMARY

The present disclosure seeks to provide an image display system. The present disclosure also seeks to provide a method of operating an image display system. Furthermore, the present disclosure seeks to provide an image projecting device.

The present disclosure seeks to provide a solution to the existing problem of bulkiness, unreliability and inefficiency associated with displaying three-dimensional content having high resolution to viewers. An aim of the present disclosure is to provide a solution that overcomes at least partially the problems encountered in prior art, and offers a robust and efficient image display system for presenting three-dimensional content having high quality in terms of brightness, contrast, image resolution and so forth to viewers.

In one aspect, an embodiment of the present disclosure provides an image display system comprising:
—an image source for producing an image, wherein the image source comprises a plurality of display units arranged in an array and wherein each display unit of the plurality of display units is configured to emit collimated light for producing a pixel of the image;
—a volumetric display module comprising a plurality of optical diffuser elements arranged in a stack, wherein an optical diffuser element of the plurality of optical diffuser elements is maintained in a:
—first state to allow incident light to pass through the optical diffuser element, or
—second state to allow projection of an image on the optical diffuser element by scattering of incident light; and
—a controller operatively coupled to each of the image source and the volumetric display module, wherein the controller is configured to control:
—an optical diffuser element of the plurality of optical diffuser elements to maintain the optical diffuser element in the second state,
—remaining optical diffuser elements of the plurality of optical diffuser elements to maintain the optical diffuser elements in the first state, and
—the plurality of display units to emit collimated light for projecting the image on the optical diffuser element maintained in the second state.

In another aspect, an embodiment of the present disclosure provides a method of operating an image display system, the method comprising:
—producing an image using an image source, wherein the image source comprises a plurality of display units arranged in an array and wherein each display unit of the plurality of display units is configured to emit collimated light for producing a pixel of the image;
—providing a volumetric display module comprising a plurality of optical diffuser elements arranged in a stack, wherein an optical diffuser element of the plurality of optical diffuser elements is maintained in a:
—first state to allow incident light to pass through the optical diffuser element, or
—second state to allow scattering of incident light and projection of the image on the optical diffuser element;
—controlling, using a controller:
—an optical diffuser element of the plurality of optical diffuser elements to maintain the optical diffuser element in the second state,
—remaining optical diffuser elements of the plurality of optical diffuser elements to maintain the optical diffuser elements in the first state, and
—the plurality of display units to emit collimated light for projecting the image on the optical diffuser element maintained in the second state.

In yet another aspect, an embodiment of the present disclosure provides an image projecting device, wherein the image projecting device is configured to produce an image on an optical diffuser element of a volumetric display module, and wherein the image projecting device comprises:

—an image source comprising a plurality of display units arranged in an array, wherein each display unit of the plurality of display units is configured to emit collimated light for producing a pixel of the image; and —a controller operatively coupled to the image source, wherein the controller is configured to control the plurality of display units to emit collimated light for producing the corresponding pixel of the image on the optical diffuser element of the volumetric display module.

Embodiments of the present disclosure substantially eliminate or at least partially address the aforementioned problems in the prior art, and enable truthful depiction of the three-dimensional image via the volumetric display arrangement. Further, the represented three-dimensional images have an enhanced psychological depth cues and physical depth cues to correctly imitate depth associated with an image being viewed by the viewer. Additionally, the experience of the viewer is further enhanced by combining the view of real-world environment to the image being viewed.

Additional aspects, advantages, features and objects of the present disclosure would be made apparent from the drawings and the detailed description of the illustrative embodiments construed in conjunction with the appended claims that follow.

It will be appreciated that features of the present disclosure are susceptible to being combined in various combinations without departing from the scope of the present disclosure as defined by the appended claims.

BRIEF DESCRIPTION OF THE DRAWINGS

The summary above, as well as the following detailed description of illustrative embodiments, is better understood when read in conjunction with the appended drawings. For the purpose of illustrating the present disclosure, exemplary constructions of the disclosure are shown in the drawings. However, the present disclosure is not limited to specific methods and instrumentalities disclosed herein. Moreover, those in the art will understand that the drawings are not to scale. Wherever possible, like elements have been indicated by identical numbers.

Embodiments of the present disclosure will now be described, by way of example only, with reference to the following diagrams wherein.

In the accompanying drawings, an underlined number is employed to represent an item over which the underlined number is positioned or an item to which the underlined number is adjacent. A non-underlined number relates to an item identified by a line linking the non-underlined number to the item. When a number is non-underlined and accompanied by an associated arrow, the non-underlined number is used to identify a general item at which the arrow is pointing.

DETAILED DESCRIPTION OF EMBODIMENTS

The following detailed description illustrates embodiments of the present disclosure and ways in which they can be implemented. Although some modes of carrying out the present disclosure have been disclosed, those skilled in the art would recognize that other embodiments for carrying out or practicing the present disclosure are also possible.

In one aspect, an embodiment of the present disclosure provides an image display system comprising:

—an image source for producing an image, wherein the image source comprises a plurality of display units arranged in an array and wherein each display unit of the plurality of display units is configured to emit collimated light for producing a pixel of the image;

—a volumetric display module comprising a plurality of optical diffuser elements arranged in a stack, wherein an optical diffuser element of the plurality of optical diffuser elements is maintained in a:

—first state to allow incident light to pass through the optical diffuser element, or —second state to allow projection of an image on the optical diffuser element by scattering of incident light; and —a controller operatively coupled to each of the image source and the volumetric display module, wherein the controller is configured to control:

—an optical diffuser element of the plurality of optical diffuser elements to maintain the optical diffuser element in the second state, —remaining optical diffuser elements of the plurality of optical diffuser elements to maintain the optical diffuser elements in the first state, and —the plurality of display units to emit collimated light for projecting the image on the optical diffuser element maintained in the second state.

In another aspect, an embodiment of the present disclosure provides a method of operating an image display system, the method comprising:

—producing an image using an image source, wherein the image source comprises a plurality of display units arranged in an array and wherein each display unit of the plurality of display units is configured to emit collimated light for producing a pixel of the image;

—providing a volumetric display module comprising a plurality of optical diffuser elements arranged in a stack, wherein an optical diffuser element of the plurality of optical diffuser elements is maintained in a:

—first state to allow incident light to pass through the optical diffuser element, or —second state to allow scattering of incident light and projection of the image on the optical diffuser element;

—controlling, using a controller:

—an optical diffuser element of the plurality of optical diffuser elements to maintain the optical diffuser element in the second state, —remaining optical diffuser elements of the plurality of optical diffuser elements to maintain the optical diffuser elements in the first state, and —the plurality of display units to emit collimated light for projecting the image on the optical diffuser element maintained in the second state.

In yet another aspect, an embodiment of the present disclosure provides an image projecting device, wherein the image projecting device is configured to produce an image on an optical diffuser element of a volumetric display module, and wherein the image projecting device comprises:

—an image source comprising a plurality of display units arranged in an array, wherein each display unit of the plurality of display units is configured to emit collimated light for producing a pixel of the image; and —a controller operatively coupled to the image source, wherein the controller is configured to control the plurality of display units to emit collimated light for producing the corresponding pixel of the image on the optical diffuser element of the volumetric display module.

The image display system comprises the image source. The image source comprises the plurality of display units, such that the plurality of display units is configured to emit collimated light for producing the image. The image produced using the collimated light leads to reduction in loss of quality (such as image resolution) of image due to divergence experienced by light transmitted for producing the image. Thus, the image produced by the image source will be associated with high image resolution, sharpness and so forth, as compared to images produced by conventional techniques for producing images. Furthermore, the image display system comprises the volumetric display module comprising the plurality of optical diffuser elements, such that each optical diffuser element can be switched between the first state and the second state. Such plurality of optical diffuser elements enables projection of different planes of a three-dimensional image at different depths, thereby, enabling a viewer to experience an actual depth of an object represented within the image. Furthermore, as eyes of the viewer can focus at different physical depths associated with different optical diffuser elements, the viewer does not experience vergence-accommodation conflict, thereby, enabling to overcome various problems associated with conventional stereoscopic techniques of displaying three-dimensional content to viewers. Furthermore, as the image source enables production of images having high quality (such as high image resolution and/or brightness) without necessitating additional optical elements, the image display system is compact, robust and efficient as compared to commercially available volumetric display systems.

Throughout the present disclosure, the term "image display system" refers to a system of interconnected components that enables to display one or more images to a viewer. Such one or more images displayed using the image display system can be three-dimensional images. The term "three-dimensional image" as used throughout the present disclosure, refers to an image that enables a viewer to perceive a depth of an object displayed within the image. For example, conventional image display systems enable presentation of two-dimensional images to viewers, such that the viewer perceives only a height and a width of an object displayed within the image across a two-dimensional plane (such as, on a display screen used for displaying the two-dimensional image). Furthermore, the display of such a two-dimensional image on the display screen is associated with the viewer perceiving the object as having a unit depth (or no depth). However, the image display system enables the viewer to perceive the two-dimensional nature of the object as well as the depth of the object displayed within the image (explained in more detail herein after).

The image display system can be employed in applications that require the viewer to perceive the depth of the object displayed within the image. Such a depth of the object is an actual depth (or substantially close to the actual depth) of the object as opposed to a stereoscopic depth of the object that the viewer perceives during stereoscopic reconstruction of object on a two-dimensional plane. For example, the image display system can be employed by a product designer designing a product using computer-modelling software to perceive the product being designed from more than one direction at a time. In another example, the image display system can be employed for medical application, such as, by a doctor to view a three-dimensional body-scan of a patient.

The image display system comprises an image source for producing an image. The image source is a component of the image display system that receives and subsequently, produces graphical information associated with the image that is to be displayed using the image display system. The image source can be operatively coupled to a computer, such that the computer provides the graphical information to the image source to be displayed as the image. For example, the computer can be coupled to the image source using a Universal Serial Bus (USB) connection, a High-Definition Multimedia Interface (HDMI) connection, a wireless communications link (such as, by employing WiGig or a Local Area Network), and so forth. Furthermore, the computer provides the graphical information to the image source using a file-format that enables optimal display of the image. Alternatively, the computer provides the graphical information to the image source using a first file-format and the image source converts the file-format of the graphical information from the first file-format to a second file-format to enable optimal display of the image.

As explained herein before, the images displayed using the image display system are three-dimensional images (referred to as "3D images" herein after). Consequently, the images produced by the image source comprise a plurality of image slices corresponding to the 3D image to be displayed using the image display system. The term "image slice" as used throughout the present disclosure, refers to each of a planar portion of a 3D image. Such image slices of the object when put together enable the display of the 3D image, such that the viewer can perceive the depth of the object displayed within the 3D image. For example, an object to be displayed with the 3D image is a spherical ball. In such an example, the image slices of the spherical ball correspond to a first set of circles, each having a bigger diameter than a preceding circle of the first set of circles and a second set of circles, each having a smaller diameter than a preceding circle of the second set of circles. Furthermore, the first set and the second set of circles are separated by a circle having a bigger diameter as compared to any circle within the first set or the second set of circles, such that the circle corresponds to a middle plane of the spherical ball. Moreover, when the image slices corresponding to the first set of circles, the circle having the biggest diameter and the second set of circles are arranged together in that order and displayed to the viewer, the viewer perceives the depth associated with the spherical ball. Such a display of 3D images using the image slices provides a convenient technique for enabling the viewer to perceive the depth of the object displayed within the image. Furthermore, such image slices reduce a necessity for altering the images (such as, for stereoscopic reconstruction of the images), thereby, maintaining a quality (such as, image resolution and/or sharpness) of the images. Moreover, displaying of the 3D image using the image slices reduces an amount of pre-processing of the images that is required to display the depth of the image (such as, for light field rendering or holographic rendering of the images).

The image source comprises a plurality of display units arranged in an array. The term "display unit" as used throughout the present disclosure, relates to an electronic component that can be controlled to emit light. The light emitted by each of the plurality of display units can be controlled to have a same or different characteristic (such as colour and/or intensity) as other display units. For example, each display unit of the plurality of display units can be controlled to emit red light. In another example, a first set of the plurality of display units can be controlled to emit blue light while a second set of the plurality of display units can be controlled to emit green light. Furthermore, the display units are arranged in the array, such as, in a rectangular matrix having a predefined number of rows and columns. For example, the display units are arranged in the array having 1920 columns and 1080 rows to enable the displayed image to have an image resolution of 1920×1080 pixels. In another example, the display units are arranged in the array having 4096 columns and 2160 rows to enable the displayed image to have an image resolution of 4096×2160 pixels (or "4K resolution").

Furthermore, each display unit of the plurality of display units is configured to emit collimated light for producing a pixel of the image. As explained herein above, each display unit can be controlled to emit light having specific characteristics of colour and intensity. Moreover, each display unit is configured to emit collimated light. Such collimated light is emitted as light beams comprising parallel light rays, causing the emitted light to experience minimum divergence during transmission thereof from a source (such as the display units) to a target of the emitted light (such as an optical diffuser element of a volumetric display module, explained in detail herein later). It will be appreciated that such a reduction in the divergence associated with the emitted light leads to improvement in the quality (such as, image resolution) of the images produced by the emitted light. Furthermore, a display unit of the plurality of display units emits light having characteristics associated with a pixel of the image, such that a position of the pixel within the produced image corresponds to a position of the display unit within the array. For example, the display units are arranged in the array having 4096 columns and 2160 rows for the produced to have the image resolution of 4096×2160 pixels. In such an example, if a pixel at a top-right corner of the produced image is a white pixel, then a display unit arranged at a top-right corner of the array is controlled to emit collimated light having a required intensity to produce the white pixel. Such a display unit can be implemented as an RGB (red-green-blue) display configured to emit light corresponding to red, green and blue coloured sub-pixels. Furthermore, the RGB display emits red, green and blue light such that a combination thereof produces the pixel having a required colour (such as white) and intensity. Alternatively, the display unit can be implemented as a B&W (black and white) display. Similarly, if a pixel at a bottom-left corner of the produced image is an orange pixel, then a display unit arranged at a bottom-left corner of the array is controlled to emit collimated light having a required intensity to produce the orange pixel.

Optionally, a display unit is controlled to emit collimated light corresponding to a sub-pixel of the produced image. For example, the display units can be arranged in a plurality of pairs along the array, such that each display unit belonging to a pair of display units is configured to emit collimated light having the same characteristics. In such an example, when a pixel at the right-top corner of the produced image is a white pixel, then each display unit of the pair of display units arranged at the top-right corner of the array is controlled to emit white light. Alternatively, each display unit of the pair of display units is configured to emit collimated light having different characteristics, such that a combination of the emitted light produces a pixel of the image.

In an embodiment, the image source is one of a laser diode-based array, a light emitting diode (LED) microdisplay, or a thin film transistor liquid-crystal display. For example, the image source is implemented as an array of laser-diodes, such that each laser-diode is configured to emit collimated light. In another example, the image source is implemented as a microLED display comprising a plurality of microscopic LEDss, such that each microscopic LED of the plurality of microscopic LEDss is controlled to emit collimated light corresponding to a pixel of the produced image. Alternatively, the image source can be implemented as part of a transmissive-type spatial light modulator. In such an example, the transmissive-type spatial light modulator comprises an array of light sources, such that each light source of the array of light sources is configured to emit collimated light. Furthermore, specific characteristics of the light emitted by each light source is controlled during transmission thereof through the spatial light modulator to enable display of images having high quality (such as, image resolution). Optionally, each light source implemented as part of the transmissive-type spatial light modulator comprises at least one laser-diode. For example, when the image source is configured to produce multi-coloured images, each light source comprises a set of laser-diodes configured to emit red light, green light and blue light respectively. In such an example, the light emitted by the light source implemented using the laser-diodes will be highly collimated. Furthermore, the emitted light can be made to have any colour, such as, by combination of lights having red-, green- and blue-coloured lights, by controlling the light (such as, intensity) emitted by each of the laser-diodes. In another example, when the image source is configured to produce monochromatic images, each light source is implemented as a laser-diode configured to emit monochromatic light. Optionally, each light source implemented as part of the transmissive-type spatial light modulator comprises a light emitting device configured to emit non-coherent light and an optical device positioned in an optical path of the emitted non-coherent light. For example, the light emitting device configured to emit non-coherent light is an LED microdisplay and the optical device positioned in the optical path of the non-coherent light is an electrically-tunable liquid crystal microlens. In another example, the light emitting device configured to emit non-coherent light is an LED microdisplay and the optical device positioned in the optical path of the non-coherent light is a light guide (such as, an optical waveguide). In such an example, the light guide can comprise at least one holographic grating, such that the non-coherent light received by the light guide is transmitted via the at least one holographic grating. Consequently, the light exiting the light guide will be collimated light.

Optionally, the image source further comprises a backlight arrangement configured to emit collimated and directional light. For example, the image source is implemented as the thin film transistor liquid-crystal (TFT LCD) display. Such a TFT LCD can be an image source that does not emit collimated light and therefore, requires an external source of light for producing the image. Consequently, the backlight arrangement is arranged with the TFT LCD such that the backlight arrangement emits the collimated and directional light towards the TFT LCD. The collimated and directional light emitted by the backlight arrangement is transmitted via the TFT LCD to enable the TFT LCD to act as the image source and subsequently, produce the image. Optionally, at least one microlens, at least one holographic microlens, at least one Fresnel microlens and/or at least one metamaterial microlens is arranged in an optical path of the light emitted from the backlight arrangement. Such at least one microlens, holographic microlens, at least one Fresnel microlens and/or metamaterial microlens enable collimation of the light emitted by the backlight arrangement, thereby, reducing divergence associated with the emitted light and consequent improvement in quality (such as, image resolution) of the images produced by the TFT LCD using the light emitted by the backlight arrangement.

Optionally, the image source comprises a plurality of light sources operatively coupled to a reflective-type spatial light modulator. Furthermore, each light source of the plurality of light sources can be configured to emit collimated light. In an example, each light source of the plurality of light sources comprise at least one laser beam (such as, a single expanded laser beam or a plurality of laser beams corresponding to different colours). It will be appreciated that when each light source of the plurality of light sources comprise the plurality of laser beams corresponding to different colours, collimated light having different colours can be emitted at the reflective-type spatial light modulator in a time-sequential manner. Optionally, each light source implemented as part of the reflective-type spatial light modulator comprises at least one laser-diode. For example, when the image source is configured to produce multi-coloured images, each light source comprises a set of laser-diodes configured to emit red light, green light and blue light respectively. In such an example, the light emitted by the light source implemented using the laser-diodes will be highly collimated. Furthermore, the emitted light can be made to have any colour, such as, by combination of lights having red-, green- and blue-coloured lights, by controlling the light (such as, intensity) emitted by each of the laser-diodes. In another example, when the image source is configured to produce monochromatic images, each light source is implemented as a laser-diode configured to emit monochromatic light. Optionally, each light source implemented as part of the reflective-type spatial light modulator comprises a light emitting device configured to emit non-coherent light and an optical device positioned in an optical path of the emitted non-coherent light. For example, the light emitting device configured to emit non-coherent light is an LED microdisplay and the optical device positioned in the optical path of the non-coherent light is an electrically-tunable liquid crystal microlens. In another example, the light emitting device configured to emit non-coherent light is an LED microdisplay and the optical device positioned in the optical path of the non-coherent light is a light guide (such as, an optical waveguide). In such an example, the light guide can comprise at least one holographic grating, such that the non-coherent light received by the light guide is transmitted via the at least one holographic grating. Consequently, the light exiting the light guide will be collimated light.

In an example, the reflective-type spatial light modulator can comprise a Digital Micromirror Device (DMD). Such a DMD can comprise a plurality of micromirrors arranged in an array, such that the array corresponds to the image resolution of the image to be produced by the image source. Furthermore, each micromirror of the plurality of micromirrors can tilt towards a corresponding light source of the plurality of light sources, to enable emission of light corresponding to a pixel of the image; or the micromirror can tilt away from the light source to prevent emission of the light. Moreover, the light reflected by the micromirror may be transmitted via optical elements (such as a folding mirror, a microlens or an array of microlenses) and a colour filter, to enable projection of a pixel having required characteristics (such as colour and/or intensity). Such an image source implemented using the plurality of light sources operatively coupled to the reflective-type spatial light modulator enables to produce the image by emission of collimated and directional light, thereby, enabling display of images having high quality (such as, image resolution) to the viewer. In another example, the reflective-type spatial light modulator can comprise a Liquid Crystal on Silicon (LCoS) microdevice (such as reflective LCoS or Ferroelectric LCoS microdevice). The LCoS microdevice optionally employs liquid crystals contained between polarized panels, to guide light emitted by each light source of the plurality of light sources towards a microlens and/or a microprism. Moreover, an additional collimation post modulator could be used to improve sharpness of an image. The light that is transmitted through the microlens and/or the microprism enables projection of a pixel having required characteristics (such as colour and/or intensity).

Furthermore, the image display system comprises a volumetric display module comprising a plurality of optical diffuser elements arranged in a stack. The volumetric display module refers to a component of the image display system that receives the image produced by the image source and consequently, enables the image to be presented to the viewer. The volumetric display module is positioned in an optical path of the light emitted by the image source. The volumetric display module comprises a plurality of optical diffuser elements. Each optical diffuser element of the plurality of optical diffuser elements individually acts as a display screen to enable display of the image produced by the image source. The optical diffuser elements are arranged parallel to each other to form a stack of the optical diffuser elements. In an embodiment, the volumetric display module is implemented to have a monolithic structure. For example, the stack of optical diffuser elements is laminated to form the monolithic structure. In another example, a layer of resin, a layer of polymer or alternate layers of resin and polymer are arranged between successive optical diffuser elements arranged in the stack. In such an example, the stack of the optical diffuser elements having the resin and/or polymer layers between the optical diffuser elements can be laminated together to form the monolithic structure. Optionally, the volumetric display module is arranged within a housing. For example, the housing can be a cubical structure having dimensions corresponding to the stack of optical diffuser elements. In such an example, at least one face of the cubical structure will be left open to enable the viewer to view the 3D image displayed on the volumetric display module.

Moreover, an optical diffuser element of the plurality of optical diffuser elements is maintained in a first state to allow incident light to pass through the optical diffuser element, or in a second state to allow projection of an image on the optical diffuser element by scattering of incident light. Each optical diffuser element of the plurality of optical diffuser elements is implemented as an electrically controllable, liquid crystal-based device. Furthermore, application of a specific voltage across the optical diffuser element changes an optical state thereof. Therefore, each optical diffuser element of the plurality of optical diffuser elements is operatively coupled to a voltage source that enables the application of the voltage to the optical diffuser element. The optical diffuser elements can be maintained in the first state that corresponds to an optically transparent state. Such an optically transparent state of the optical diffuser element enables incident light to be transmitted through the optical diffuser element. For example, when maintained in the first state, substantially 95% of incident light belonging to visible spectrum is transmitted through the optical diffuser element. Alternatively, the optical diffuser elements can be maintained in the second state that corresponds to an optically light-diffusive state. Such an optically light-diffusive state of the optical diffuser element causes the light incident on the optical diffuser element to be scattered, thereby, enabling an image to be projected on the optical diffuser element.

The voltage source that is operatively coupled to each of the plurality of optical diffuser elements enables the optical state of each optical diffuser element to be changed between the first state and the second state, based on application of a specific voltage or removal of the applied voltage. For example, the voltage source is configured to apply the specific voltage to an optical diffuser element to maintain the optical diffuser element in the first state (or the optically transparent state). Correspondingly, the voltage source is configured to remove the applied voltage from the optical diffuser element to change the optical state of the optical diffuser element from the first state to the second state (or the optically light-diffusive state). Furthermore, during operation of the image display system, only one optical diffuser element of the plurality of optical diffuser elements is maintained in the optically light-diffusive state and all other optical diffuser elements are maintained in the optically transparent state at any given instant. The optical diffuser element that is maintained in the optically light-diffusive state acts as a display screen to allow projection of the image on the optical diffuser element, such that the image corresponds to the image produced by the image source by emission of light therefrom. Optionally, each optical diffuser element of the plurality of optical diffuser elements is successively switched from the optically transparent state to the optically light-diffusive state. Correspondingly, an image slice of the plurality of image slices of the 3D image is projected onto the optical diffuser element maintained in the light-diffusive state to enable display of the 3D image on the volumetric display module (explained in detail herein below).

In one embodiment, the image display system further comprises an optical structure comprising a plurality of light tubes arranged in an array. The optical structure is implemented such that the array comprises a light tube corresponding to each display unit of the plurality of display units of the image source. For example, when the plurality of display units is arranged in the array having 1920 columns and 1080 rows, the plurality of light tubes is arranged in an array having 1920 columns and 1080 rows. The optical structure is positioned between the image source and the volumetric display module. Consequently, light emitted by a display unit of the plurality of display units enters into a corresponding light tube of the plurality of light tubes, from one end and exits from another end of the light tube. Furthermore, an inner surface of each light tube is configured to absorb light, such that light emitted from the display unit that may be divergent enters from one end of the light tube and exits from another end of the light tube to be pre-collimated. For example, the light tube can be configured to limit a divergence of the light exiting the light tube by absorption of the light along the inner surface of the light tube. In such an example, if a maximum angle of divergence of the light exiting the light tube is given by angle $\beta$ and when the light tube is associated with a length 'l' and diameter 'd', then the maximum angle of divergence $\beta$ can be determined as $2\arctan(d/l)$. Moreover, the diameter d of each light tube will correspond to a diameter of a display unit of the image source that is configured to emit light into the light tube (such that, the display unit is implemented as a point light source). Therefore, the light transmitted through the optical structure will be collimated light having divergence less than or equal to the maximum angle of divergence $\beta$, such that the image produced on the optical diffuser elements will be associated with high quality (such as, high image resolution and brightness). Moreover, a length of each light tube is selected based on a required collimation of light to be achieved. It will be appreciated that, such a selection of the length of each light tube also depends upon a quality of each display unit used in the image display system, such that a higher amount of divergence associated with the light emitted by each display unit requires more collimation of light to be achieved. Correspondingly, a length of each light tube of the optical structure will be selected to be longer, such as to achieve higher collimation, as compared to when a lower amount of divergence is associated with the light emitted by each display unit. Moreover and optionally, a volume of each light tube is filled with an optically transparent medium, such that the optically transparent medium has a refractive index higher than a refractive index of air (such as, air substantially having the refractive index of "1"). For example, the optically transparent medium comprises optical resin, a polymer, or a semi-viscous medium.

In another embodiment, the image display system further comprises an optical device comprising a plurality of optical elements arranged in an array, wherein the optical device is positioned between the image source and the volumetric display module, and wherein the plurality of optical elements corresponds to the plurality of display units of the image source.

In an embodiment, the image display system further comprises an optical device comprising a plurality of optical elements arranged in an array. The optical device is a component of the image display system that improves collimation of the light emitted by the plurality of display units of the image source. The optical device is positioned between the image source and the volumetric display module. For example, when the image display system comprises the optical structure, the optical device is arranged in the optical path of light exiting the optical structure. Furthermore, the plurality of optical elements corresponds to the plurality of display units of the image source and the plurality of light tubes of the optical structure, such that an optical element is positioned in an optical path from each display unit and/or light tube. The light emitted by the plurality of display units of the image source is transmitted via the plurality of light tubes and through the plurality of optical elements of the optical device. Such optical elements of the optical device focus the light, thereby, reducing divergence associated with the transmitted light and improving collimation thereof. The optical device comprises the plurality of optical elements arranged in the array, such that the array of the plurality of optical elements corresponds to the array of the plurality of display units of the image source and the array of the plurality of light tubes of the optical structure. Consequently, the light transmitted via each light tube is transmitted through an optical element of the plurality of optical elements positioned in the optical path thereof. For example, when the plurality of display units and light tubes are arranged in arrays having 1920 columns and 1080 rows each, the plurality of optical elements is arranged in an array having 1920 columns and 1080 rows. In such an example, the light transmitted via each light tube is transmitted through an individual optical element to form a beam of collimated light corresponding to a pixel of the produced image. Optionally, the optical device can be implemented using a plurality of arrays of optical elements. For example, the optical device is implemented using at least two arrays of optical elements arranged in a stack, such that each array of optical elements comprises a plurality of optical elements (and each array of optical elements comprises optical elements corresponding to the plurality of display units of the image source and/or the plurality of light tubes of the optical structure). Consequently, more than one optical element is arranged in the optical path of light transmitted via the light tube of the plurality of light tubes of the optical structure, such that each optical element focuses and refocuses the light during transmission of the light through the optical elements. Therefore, the collimation of the light transmitted through the optical device is improved manifold.

According to an embodiment, each optical element of the plurality of optical elements is one of a microlens, a holographic microlens, a Fresnel microlens, a metamaterial microlens, or a focus-tuneable microlens, such as an electrically-tuneable liquid crystal microlens. For example, each optical element of the plurality of optical elements is implemented as a conventional microlens that receives incident light from one side and transmits a converged beam of light from an opposite side. In another example, each optical element of the plurality of optical elements is implemented as an electrically-tuneable liquid crystal microlens. In such an example, each electrically-tuneable liquid crystal lens is operatively coupled to a voltage source that is configured to apply a voltage to the electrically-tuneable liquid crystal lens. It will be appreciated that when the voltage is applied, a focal length of the electrically-tuneable liquid crystal lens can be altered. Consequently, when light is emitted by the corresponding display unit to be transmitted via the electrically-tuneable liquid crystal lens, a voltage is applied to focus the light transmitted through the electrically-tuneable liquid crystal lens and improve collimation thereof. Optionally, such a voltage source can be coupled to a controller that controls the application and removal of voltage.

Optionally, more than one optical element is positioned corresponding to each display unit of the plurality of display units. For example, a pair of optical elements (such as a pair of microlenses) is positioned in the optical path of each display unit. Alternatively, more than one optical element is positioned corresponding to each pixel of the image to be displayed. For example, when a pair of display units is configured to emit collimated light corresponding to a pixel of the image, a pair of optical elements is positioned in an optical path of the pair of display units. In such an example, an optical element of the pair of optical elements corresponds to a display unit of the pair of display units. Furthermore, the collimated light emitted by the pair of display units and transmitted through the pair of optical elements enables to produce a pixel corresponding to the image to be displayed.

The image display system comprises a controller operatively coupled to each of the image source and the volumetric display module. The controller is a component of the image display system that enables operation of the image display system by controlling various other components thereof, such as the image source and the volumetric display module. The controller can be implemented as a microcontroller that is electronically coupled to each of the image source and the volumetric display module. Furthermore, the controller is configured to control the operation of the image source and the volumetric display module by transmitting signals (such as, analog signals or digital signals) thereto. Such signals carry necessary information to enable proper operation of each of the image source and the volumetric display module.

The controller is configured to control an optical diffuser element of the plurality of optical diffuser elements, to maintain the optical diffuser element in the second state. As explained herein above, only one optical diffuser element of the plurality of optical diffuser elements is maintained in the optically light-diffusive state at any given instant. The optical diffuser element that is maintained in the optically light-diffusive state acts as the display screen to enable projection of the image produced by the image source. The controller is coupled to each optical diffuser element of the plurality of optical diffuser elements via the voltage source. The controller is configured to control the voltage source to remove the voltage applied to only one optical diffuser element at any given instant, to maintain the optical diffuser element in the optically light-diffusive state.

The controller is configured to control remaining optical diffuser elements of the plurality of optical diffuser elements to maintain the optical diffuser elements in the first state. The controller is configured to control the voltage source to apply voltage to all of the remaining optical diffuser elements to maintain the optical diffuser elements in the optically transparent state, except the optical diffuser element to be maintained in the optically light-diffusive state. Furthermore, the controller is configured to remove the applied voltage successively from the optical diffuser elements, such that each optical diffuser element of the stack is maintained in the optically light-diffusive state for a predefined time duration (such as, in an order of microseconds) while all other optical diffuser elements are maintained in the optically transparent state. For example, if the stack of the plurality of optical diffuser elements comprises 10 optical diffuser elements, then the controller is configured to control the voltage source to remove the applied voltage from a first of the 10 optical diffuser elements for the predefined time duration (while the voltage is applied to all other optical diffuser elements of the stack). In such an example, once the predefined time duration has elapsed, the controller is configured to control the voltage source to apply the voltage to the first optical diffuser element while simultaneously removing the applied voltage form a second of the 10 optical diffuser elements (while the voltage is applied to all other optical diffuser elements of the stack). Similarly, the controller is configured to control the voltage source to successively remove the applied voltage until the applied voltage is removed from a last of the 10 optical diffuser elements for the predefined time duration. Subsequently, the controller is configured to restart the sequence by removing the applied voltage from the first of the 10 optical diffuser elements.

The predefined time duration that each optical diffuser element of the plurality of optical diffuser elements is maintained in the second state, is selected based on a "volumetric refresh rate" of the volumetric display module. The volumetric refresh rate of the volumetric display module relates to a frequency with which each optical diffuser element is to be switched from the first state to the second state and back to the first state. It will be appreciated that the volumetric refresh rate of the volumetric display module is to be selected based on a "flicker fusion threshold" of human visual system. The flicker fusion threshold of the human visual system relates to a frequency of change of intermittent light stimulus, such that the light stimulus appears to be completely steady to a viewer. Consequently, the volumetric refresh rate is to be selected such that when different image slices are displayed on the successive optical diffuser elements changing to the optically light-diffusive state from the optically transparent state, a collection of the different image slices enables the viewer to perceive a three-dimensional object displayed within the image as a continuous, solid object displayed on the volumetric display module (explained in detail herein below).

The controller is configured to control the plurality of display units to emit collimated light for projecting the image on the optical diffuser element maintained in the second state. As explained herein before, the images produced by the image source comprise a plurality of image slices. The controller is configured to control the plurality of display units to emit collimated light, such that only one image slice of the plurality of image slices is produced at any given instant. Consequently, the image slice produced by the plurality of display units is projected onto the optical diffuser element maintained in the second state (or optically light-diffusive state). It will be appreciated that if the optical diffuser element maintained in the second state is an optical diffuser element that is not positioned at a front of the stack, then as the other optical diffuser elements will be maintained in the first state (or the optically transparent state), the collimated light emitted by the plurality of display units will be transmitted through the other optical diffuser elements until the collimated light reaches the optical diffuser element maintained in the second state. Furthermore, as the controller switches each successive optical diffuser element from the first state to the second state, the controller is configured to control the plurality of display units to emit collimated light corresponding to a different image slice of the plurality of image slices. The controller is configured to control the plurality of display units until collimated light corresponding to all image slices of the 3D image has been emitted, such that, display of all such image slices relates to presentation of a "volumetric frame" on the volumetric display module. Optionally, the controller is configured to switch the optical diffuser elements from the first state to the second state in any predefined order. For example, the controller is configured to switch the optical diffuser elements positioned at odd positions (such as a first, a third, a fifth and so forth) from the first state to the second state, followed by switching the optical diffuser elements positioned at even positions (such as a second, a fourth, a sixth and so forth) from the first state to the second state. In another example, the controller is configured to randomly switch the optical diffuser elements from the first state to the second state.

Moreover, a frequency that is employed to switch the projected image slice corresponds to the volumetric refresh rate of the volumetric display module, such that different image slices of the plurality of image slices are displayed on different optical diffuser elements of the plurality of optical diffuser elements. Consequently, as the frequency employed for displaying the image slices will be more than the flicker fusion threshold of the human visual system, a perception of the plurality of image slices together enables the image display system to display objects within the 3D image as continuous, solid objects to the viewer.

Optionally, the controller is operatively coupled to the computer. The controller is configured to receive the graphical information associated with the image from the computer and provide the graphical information to the image source to be displayed to the viewer. For example, the controller is configured to receive the graphical information from the computer in the first file-format and consequently, convert the file-format to the second file-format to enable optimal display of the image by the image source on the volumetric display module. In another example, the controller is configured to buffer the graphical information prior to the image getting produced by the image source.

Optionally, the image source, the optical device, the volumetric display module and the controller can be positioned within a housing. Such a housing can comprise an air gap between the image source and the volumetric display module to enable transmission of the light emitted by the image source towards the volumetric display module. Furthermore, the housing comprises various electrical and electronic components (such as electrical wiring, electrical sockets and so forth) employed to operatively couple together various components of the image display system.

In one embodiment, the image source is configured to emit collimated light at an oblique angle with respect to a normal of a plane of the volumetric display module. As explained herein above, when one optical diffuser element of the plurality of optical diffuser elements is maintained in the optically light-diffusive state, all other optical diffuser elements are maintained in the optically transparent state. Furthermore, when the light emitted by the image source is perfectly collimated (such as, without any divergence of rays of light beam) the viewer perceives the image slice of the image to be located at a depth that corresponds to a depth of the optical diffuser element with respect to the stack of optical diffuser elements. However, the light emitted by the image source cannot be perfectly collimated and some divergence is experienced by the emitted light before reaching the optical diffuser element maintained in the optically light-diffusive state. For example, a beam of light emitted by a display unit may have a diameter D1 when the light reaches a first of the plurality of optical diffuser elements arranged in the stack. However, the beam of light may experience divergence and the diameter of the beam may increase to D2 before leaving a last of the plurality of optical diffuser elements arranged in the stack. Consequently, due to the divergence experienced by the beam of light and the increase in the diameter thereof from D1 to D2, the viewer experiences different quality of images (such as, images having different image resolutions and/or sharpness) when viewing image slices projected on the first optical diffuser element the last optical diffuser element respectively. Furthermore, the viewer may perceive an un-scattered component of the emitted beam of light at an optical diffuser element positioned behind the intended optical diffuser element, thus, causing the viewer to perceive a hazy image on the optical diffuser element positioned behind the intended optical diffuser element in addition to a proper image on the intended optical diffuser element. Such a hazy image further leads to degradation of a viewing experience of the 3D image for the viewer.

The image source is positioned such that each display unit of the plurality of display units emit light at an oblique angle a with respect to the normal of the plane of the volumetric display module. The term "normal of a plane" refers to a vector that is perpendicular to a plane and acts as a reference for determining a direction of orientation of the plane in space. It will be appreciated that, as each of the plurality of optical diffuser elements of the volumetric display module is arranged parallel to each other, a normal of each of the optical diffuser elements will be parallel. Furthermore, the normal of each of the optical diffuser elements will be parallel to a normal of the plane of the volumetric display module.

Optionally, when the image source does not emit collimated light (such as, in case of a TFT LCD), the external source of light employed to illuminate the image source is configured to emit light at an oblique angle a with respect to the normal of the plane of the volumetric display module.

Optionally, the image source emits collimated light and a Digital Micromirror Device (DMD) is positioned in an optical path of the emitted light. Furthermore, the DMD is configured to reflect the emitted light at the oblique angle a with respect to the normal of the plane of the volumetric display module. More optionally, a Total Internal Reflection (TIR) prism is positioned in the optical path of the light reflected from the DMD to manage a direction of transmission of the reflected light.

The oblique angle between a direction of emission of light and the normal of the plane of the volumetric display module is selected such that the viewer cannot perceive any un-scattered component of the emitted light at the optical diffuser element positioned behind the intended optical diffuser element. In one embodiment, the oblique angle is in a range of 5° to 30°. For example, the oblique angle is from 5°, 6°, 7°, 8°, 9°, 10°, 11°, 12°, 13°, 14°, 15°, 16°, 17°, 18°, 19°, 20°, 21°, 22° or 23° up to 8°, 9°, 10°, 11°, 12°, 13°, 14°, 15°, 16°, 17°, 18°, 19°, 20°, 21°, 22° 23°, 24°, 25°, 26°, 27°, 28°, 29° or 30°. In another embodiment, the oblique angle is in a range of 10° to 20°. For example, the oblique angle is from 10°, 11°, 12°, 13°, 14°, 15° or 16° up to 12°, 13°, 14°, 15°, 16°, 17°, 18°, 19° or 20°. Furthermore, the inability of the viewer to perceive the un-scattered component of the emitted light prevents the viewer from perceiving the hazy image formed at the optical diffuser element positioned behind the intended optical diffuser element, thus, leading to improvement in the viewing experience of the 3D image for the viewer.

It will be appreciated that the oblique angle between the direction of emission of light and the normal of the plane of the volumetric display module introduces misalignment between the image produced by the image source and the image projected on the optical diffuser element maintained in the second state. The controller is configured to pre-process the graphical information associated with the image prior to transmitting the graphical information to the image source for production of the image, to account for the misalignment. Thus, the controller is configured to shift the image to be produced by the image source, such that the image projected on the optical diffuser element is properly aligned. However, such a shifting of the image may lead to degradation of the quality (such as image resolution and/or sharpness) of the image projected on the optical diffuser element. Consequently, the image source is configured to produce the image having a higher image resolution as compared to a required image resolution of the image to be projected on the optical diffuser element maintained in the second state.

In an embodiment, each of the image source, the volumetric display module and the controller are incorporated in a table-top display device. Such a table-top display device is a display device that is arranged akin to a table (item of furniture) within an environment. The table-top display device enables a viewer to view images at a surface of the table. The table-top display device can comprise a housing and the image source can be positioned proximal to a base of the housing, such that the image source is configured to emit collimated light along a vertically upward direction. Furthermore, the volumetric display module is positioned proximal to the surface of the table, such that when viewers sit or stand near the table, 3D images are displayed to the viewers on the volumetric display module. Optionally, the image source is configured to emit collimated light at the oblique angle with respect to a normal of a plane of the volumetric display module. As explained herein above, when the image source if the image source is configured to emit collimated light at the oblique angle, the viewers are prevented from perceiving un-scattered components of the light emitted by the image source. Consequently, the viewers do not perceive hazy images formed at optical diffuser elements behind the intended optical diffuser element, thereby, enabling the image display system implemented within the table-top display to provide high quality 3D images (such as, images having high image resolution and/or sharpness) to viewers. Optionally, more than one of such table-top displays can be arranged close to each other for collaborative applications, such as, to display 3D images or three-dimensional environments having large dimensions as compared to a width of a single table-top display.

According to an embodiment, each of the image source, the volumetric display module and the controller are incorporated in a heads-up display (HUD). For example, the HUD comprises a housing and the image source is positioned proximal to a rear of the HUD. Furthermore, the volumetric display module is positioned proximal to a front of the HUD and the image source is configured to emit collimated light towards the volumetric display module. Furthermore, the viewer perceives the 3D image presented at the front of the HUD. Optionally, the HUD comprises optical elements (such as an optical waveguide) arranged in an optical path from the volumetric display module to the viewer. Consequently, the image source can be positioned in any other orientation based on positioning of the optical elements within the HUD. For example, such optical elements comprise folding optical elements, focusing optical elements (such as, an array of microlenses) and so forth that are configured to improve collimation of the light emitted from the volumetric display module.

In one embodiment, each of the image source, the volumetric display module and the controller are incorporated in a near-to-eye display device. The near-to-eye display device can be for example a head-mounted display device (HMD) device. The near-to-eye display device may also be simply called a display or a device, and the meaning is the same in this context. For example, the near-to-eye display device can be a head-mounted virtual-reality (VR) device. In such an example, the HMD device comprises a housing and the image source is positioned towards a rear of the housing and distal from eyes of a wearer of the HMD device. Furthermore, the volumetric display module acts as a display of the HMD device and is positioned proximal to eyes of a wearer of the HMD device.

In another example, the near-to-eye display device can be a head-mounted augmented-reality (AR) display device. The head-mounted augmented-reality (AR) display device can comprise a housing and the image source is positioned within the housing. Furthermore, the volumetric display module is positioned in an optical path of collimated light emitted from the image source. However, the volumetric display module can be positioned distal to eyes of a wearer of the HMD device. In such an example, the HMD device further comprises optical elements arranged between the volumetric display module and the eyes of the wearer. Such optical elements can comprise an optical waveguide that is arranged in the optical path between the volumetric display module and the eyes of the viewer, such that the optical waveguide transmits the light emitted from the volumetric display module by total internal reflection thereof. Optionally, the HMD device further comprises at least one holographic grating arranged to be located between the volumetric display module and eyes of the wearer of the nearto-eye display device. The at least one holographic grating plays a role in directing the light emitted from the volumetric display module towards the eyes of the viewer. The at least one holographic grating can comprise an in-coupling holographic grating that is arranged to be located in the optical path between the volumetric display module and the optical waveguide. Alternatively, the HMD device comprises a holographic mirror arranged to be located between the volumetric display device and the eyes of the viewer, such that the holographic mirror acts as an image combiner to combine the image projected by the volumetric display device with a real-world surrounding of the viewer. Furthermore, the HMD device further comprises at least one holographic grating arranged to be located between the volumetric display module and the eyes of the viewer, such that the at least one holographic grating plays a role in directing the light reflected from the holographic mirror towards the eyes of the viewer. In an example, the optical waveguide is implemented using an optically-transparent material and the at least one holographic grating is fabricated as a part of the optical waveguide. In such an example, light that is emitted towards the optical waveguide is manipulated by the at least one holographic grating that is fabricated as part of the optical waveguide. Furthermore, such at least one holographic grating that is fabricated as part of the optical waveguide, improves a transparency of the optical waveguide with respect to a displayed image for the viewer, enabling to improve an immersion for the viewer associated with display of 3D objects as part of a real-world environment around the viewer. Optionally, the HMD device further comprises focusing optical elements (such as, an array of microlenses, holographic microlenses, Fresnel microlenses, metamaterial microlenses, and/or electrically-tuneable liquid crystal lenses) positioned between the volumetric display module and the at least one holographic grating, such that the focusing optical elements are configured to assist in directing the light transmitted from the volumetric display module towards the eyes of the viewer. Optionally, each of the at least one holographic grating is a surface grating or a volumetric grating. For example, each of the at least one holographic grating is a volumetric grating. Such a volumetric grating can be fabricated by attaching a polymer film comprising the holographic grating onto a structurally-hard, optically-transparent substrate such as a mineral glass, organic glass and so forth.

According to another embodiment, the image display system further comprises at least one holographic grating arranged to be located between the light source and the volumetric display module.

Furthermore, disclosed is an image projecting device. The variants and embodiments disclosed above in connection with the image display device apply mutatis mutandis to the image projecting device. The image projecting device is configured to produce an image on an optical diffuser element of a volumetric display module. The image projecting device comprises an image source comprising a plurality of display units arranged in an array, wherein each display unit of the plurality of display units is configured to emit collimated light for producing a pixel of the image. Furthermore, the image projecting device comprises a controller operatively coupled to the image source, wherein the controller is configured to control the plurality of display units to emit collimated light for producing the corresponding pixel of the image on the optical diffuser element of the volumetric display module.

Optionally, the image source is one of a laser diode-based array, a light emitting diode micro-display, or a thin film transistor liquid-crystal display. Optionally, the image projecting device further comprises an optical structure comprising a plurality of light tubes arranged in an array, wherein the optical structure is positioned between the image source and the volumetric display module, and wherein the plurality of light tubes corresponds to the plurality of display units of the image source. Optionally, the image projecting device further comprises an optical device comprising a plurality of optical elements arranged in an array, wherein the optical device is positioned in an optical path of light transmitted through the optical structure, and wherein the plurality of optical elements corresponds to the plurality of light tubes of the optical structure. In another embodiment, the image projecting device comprises an optical device comprising a plurality of optical elements arranged in an array, wherein the optical device is positioned in an optical path of light between the image source and the volumetric display module, and wherein the plurality of optical elements corresponds to the plurality of display units of the image source. Optionally, each optical element of the plurality of optical elements is one of a microlens, a holographic microlens, a Fresnel microlens, a metamaterial microlens, or a focus-tuneable microlens, such as an electrically-tuneable liquid crystal microlens. Optionally, the image source comprises a plurality of light sources operatively coupled to a spatial light modulator. More optionally, the spatial light modulator is one of: a transmissive-type spatial light modulator, or a reflective-type spatial light modulator.

Various embodiments and variants disclosed above apply mutatis mutandis to the image projecting device.

Moreover, disclosed is a method of operating an image display system. The method comprises producing an image using an image source, wherein the image source comprises a plurality of display units arranged in an array and wherein each display unit of the plurality of display units is configured to emit collimated light for producing a pixel of the image. Furthermore, the method comprises providing a volumetric display module comprising a plurality of optical diffuser elements arranged in a stack, wherein an optical diffuser element of the plurality of optical diffuser elements is maintained in a first state to allow incident light to pass through the optical diffuser element, or in a second state to allow scattering of incident light and projection of the image on the optical diffuser element. Moreover, the method comprises controlling using a controller, an optical diffuser element of the plurality of optical diffuser elements to maintain the optical diffuser element in the second state, and remaining optical diffuser elements of the plurality of optical diffuser elements to maintain the optical diffuser elements in the first state. The method comprises controlling using the controller the plurality of display units to emit collimated light for projecting the image on the optical diffuser element maintained in the second state. Optionally, the image display system further comprises a plurality of focus-tuneable microlenses, such as electrically-tuneable liquid crystal microlenses positioned between the image source and the volumetric display module and each of the plurality of electrically-tuneable liquid crystal microlenses is operatively coupled to the controller. The method further comprises using the controller to control an optical diffuser element of the plurality of optical diffuser elements to maintain the optical diffuser element in the second state, and using the controller to control the plurality of electrically-tuneable liquid crystal microlenses to focus the collimated light emitted from the image source onto the optical diffuser element maintained in the second state.

Various embodiments and variants disclosed above apply mutatis mutandis to the method.

DETAILED DESCRIPTION OF THE DRAWINGS

Figure 1:
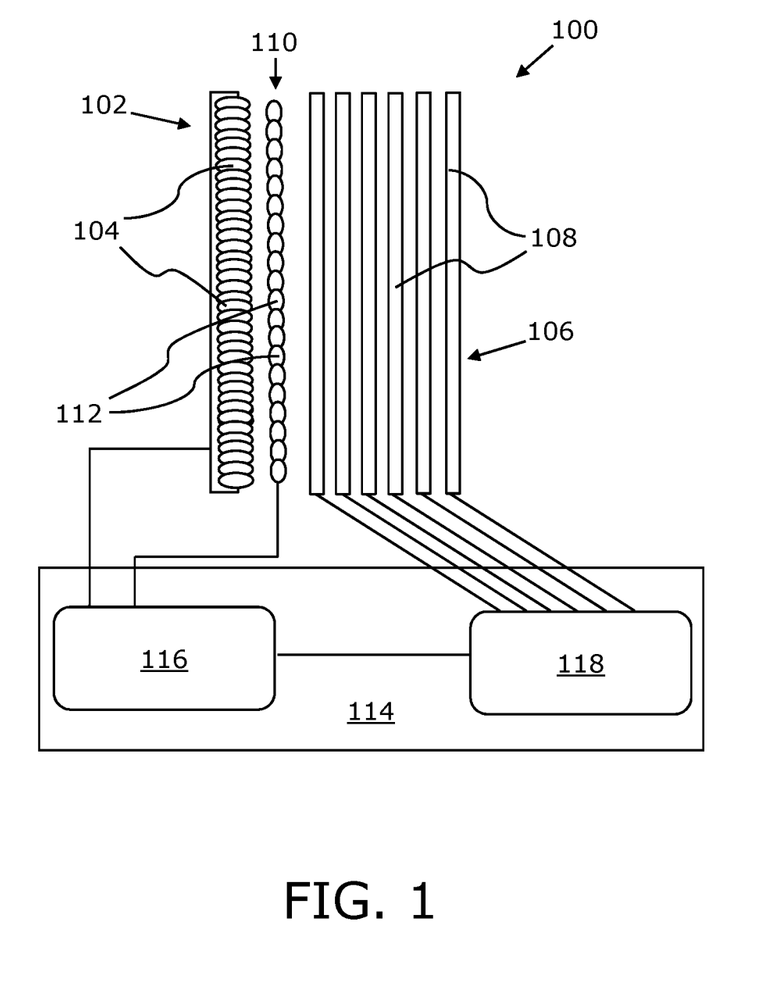
FIGS. 1 and 2 are schematic illustrations of image display systems, in accordance with various embodiments of the present disclosure.

Referring to FIG. 1, there is shown a schematic illustration of an image display system 100, in accordance with an embodiment of the present disclosure. As shown, the image display system 100 comprises an image source 102 for producing an image. The image source 102 comprises a plurality of display units 104 arranged in an array. Furthermore, the image display system 100 comprises a volumetric display module 106 comprising a plurality of optical diffuser elements 108 arranged in a stack. The image display system 100 comprises an optical device 110 comprising a plurality of optical elements 112 arranged in an array. As shown, the optical device 110 is positioned between the image source 102 and the volumetric display module 106. Moreover, the image display system 100 comprises a controller 114 operatively coupled to each of the image source 102 and the volumetric display module 106. As shown, the controller 114 comprises control logics 116 coupled to each of the image source 102, the optical device 110 and a diffuser driver 118. The control logics 116 is configured to control an operation of each of the image source 102, the optical device 110 and the diffuser driver 118. Furthermore, the diffuser driver 118 is operatively coupled to each of the plurality of optical diffuser elements 108 and configured to control an operation thereof (such as, switching between a first and a second state).

Figure 2:
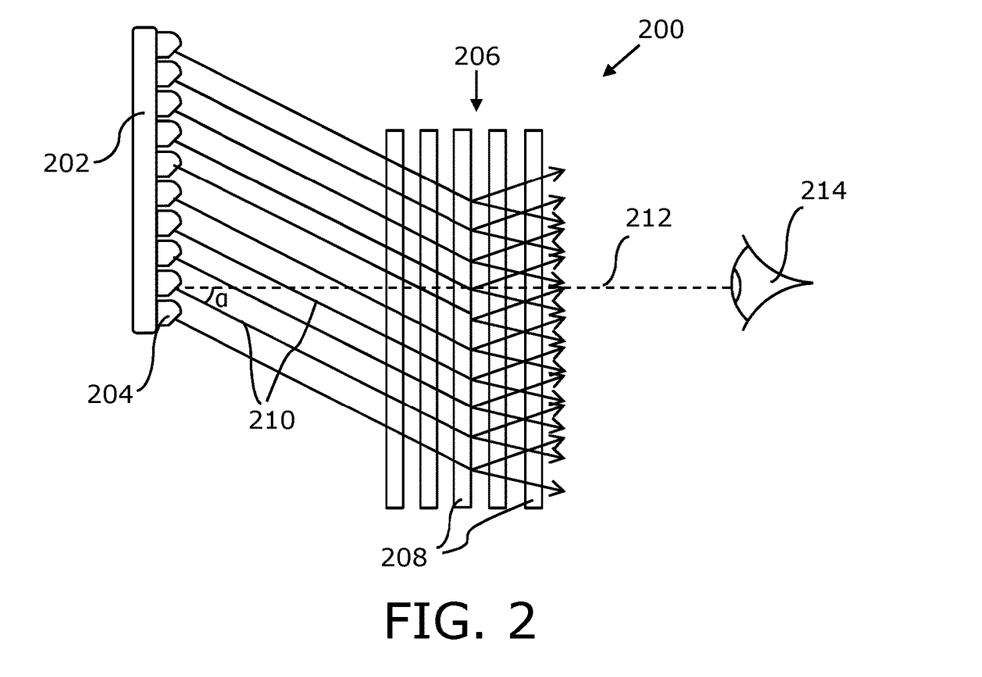

Referring to FIG. 2, there is shown a schematic illustration of an image display system 200, in accordance with an embodiment of the present disclosure. The image display system 200 comprises an image source 202 for producing an image. The image source 202 comprises a plurality of display units 204 arranged in an array. Furthermore, the image display system 200 comprises a volumetric display module 206 comprising a plurality of optical diffuser elements 208 arranged in a stack. As shown, the image source 202 is configured to emit collimated light 210 at an oblique angle a with respect to a normal 212 of a plane of the volumetric display module 206. The light emitted from the image source 202 is scattered by a diffuser element 208 and the scattered light reaches an eye 214 of a viewer.

Figure 3:
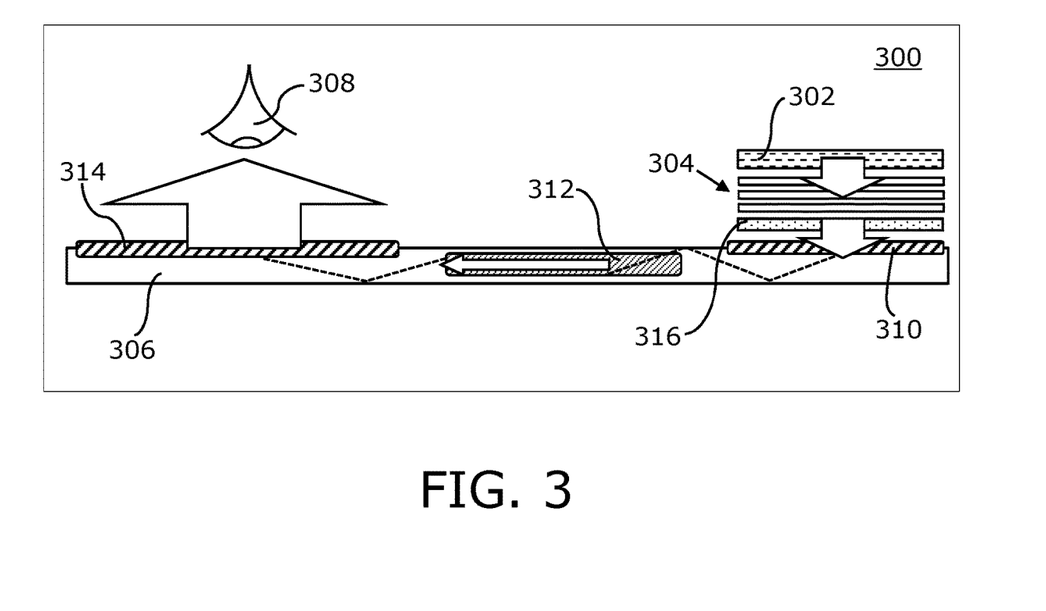
FIGS. 3 and 4 are schematic illustrations of image display systems implemented as head-mounted display devices, in accordance with various embodiment of the present disclosure.

Referring to FIG. 3, there is shown a schematic illustration of an image display system implemented as a head-mounted display device 300, in accordance with an embodiment of the present disclosure. The head-mounted display device 300 comprises an image source 302 and a volumetric display module 304 positioned in an optical path from the image source 302. The head-mounted display device 300 comprises an optical waveguide 306 positioned in the optical path of the light between the volumetric display module 304 and eyes 308 of a viewer. Furthermore, the head-mounted display device 300 comprises at least one holographic grating, such as an in-coupling holographic grating 310, an intermediate holographic grating 312 and an exit holographic grating 314 arranged to be located between the volumetric display module304 and eyes 308 of the wearer of the head-mounted display device 300. Moreover, the head-mounted display device 300 comprises focusing optic element 316 positioned between the volumetric display module 304 and the in-coupling holographic grating 310.

Figure 4:
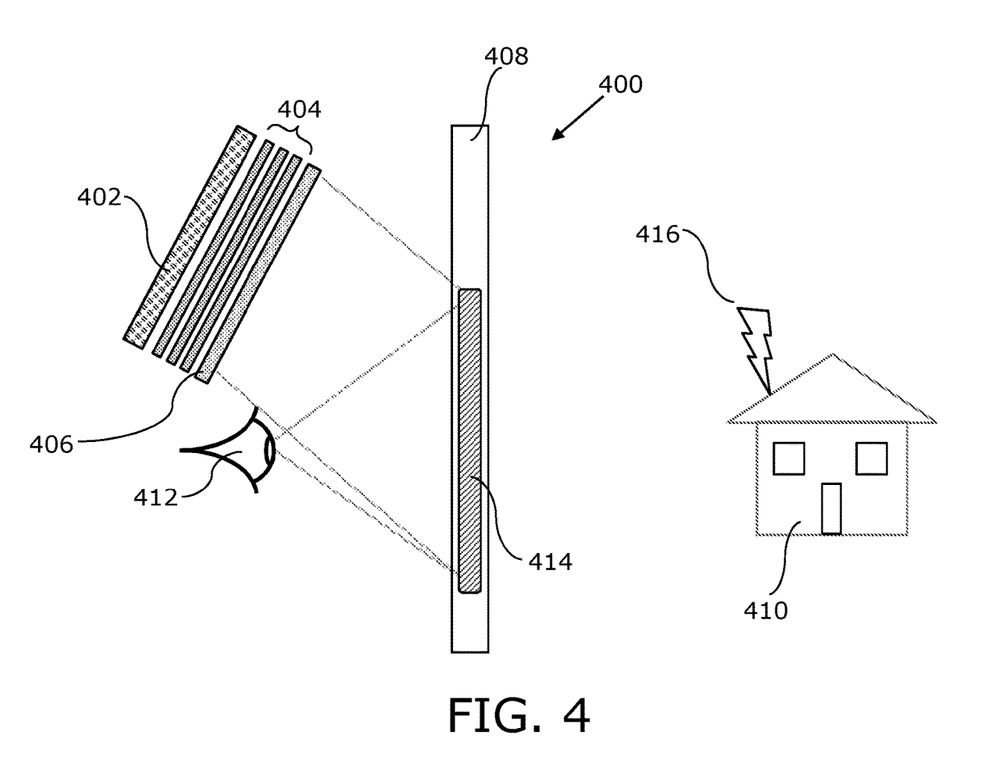

Referring to FIG. 4, there is shown a schematic illustration of an image display system implemented as a head-mounted display device 400, in accordance with an embodiment of the present disclosure. The head-mounted display device 400 comprises an image source 402 and a volumetric display module 404 positioned in an optical path from the image source 402. Furthermore, the head-mounted display device 400 comprises an optical device 406 positioned in an optical path of light transmitted from the volumetric display module 404, such that the optical device 406 focuses the light to improve collimation thereof. Optionally, the optical device 406 acts as a magnifying eyepiece. Furthermore, the head-mounted display device 400 comprises an optical image combiner 408 that enables light associated with a real-world object 410 to reach eyes 412 of a viewer. Optionally, the optical image combiner 408 is implemented as a semi-transparent mirror. As shown, the optical image combiner 408 incorporates at least one holographic grating 414 therein. Optionally, the at least one holographic grating 414 is implemented as a volumetric grating. As shown, light transmitted from the volumetric display module 404 passes through the optical device 406 and is subsequently reflected by the optical image combiner 408 towards the eyes 412 of the viewer. Furthermore, when such light is associated with a virtual 3D object 416 (such as, a computer-generated object), as the real-world object 410 is visible to the eyes 412 of the viewer, the viewer perceives the virtual 3D object 416 to be a part of a real-world environment that the real-world object 410 forms a part thereof. The at least one holographic grating 414 enables manipulation of the light associated with the virtual 3D object 416 emitted from the volumetric display module 404, such that the viewer perceives depth associated with the virtual 3D object 416, thereby, improving perception for the viewer of the virtual 3D object 416 as being the part of the real-world environment.

Figure 5:
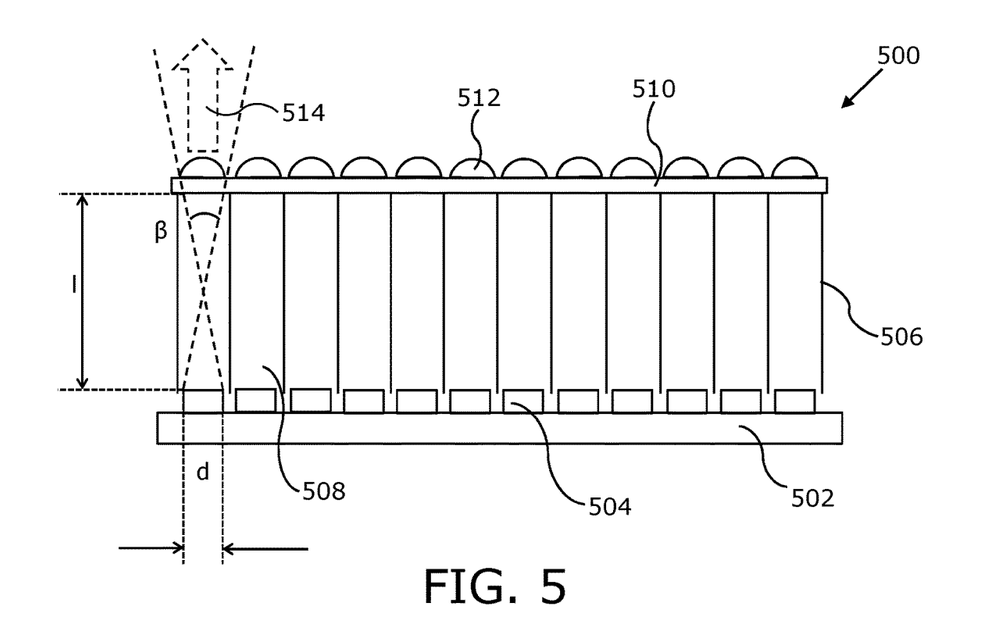
FIG. 5 is a schematic illustration of an image display system, in accordance with an embodiment of the present disclosure.

Referring to FIG. 5, there is shown a schematic illustration of an image display system 500, in accordance with an embodiment of the present disclosure. The image display system 500 comprises an image source 502 comprising a plurality of display units 504 arranged in an array. Furthermore, the image display system 500 comprises an optical structure 506 comprising a plurality of light tubes 508 arranged in an array. The plurality of light tubes 508 of the optical structure 506 correspond to the plurality of display units 504 of the image source 502, such that light emitted by a display unit 504 is received into a corresponding light tube 508. Furthermore, an inner surface of each light tube 508 is configured to absorb light, such that light exits the light tube 508 at an angle β. Moreover, when a diameter of each light tube 508 is 'd' and a length of the light tube 508 is 'l', then the angle β is given by 2arctan(d/l). Consequently, each light tube 508 acts as a pre-collimator, to enable collimation of the light exiting the light tube 508. As shown, the image display system 500 further comprises an optical device 510 arranged in an optical path of the light exiting the optical structure 506, such that the optical device 510 comprises a plurality of lenslets 512 (for example, microlenses) corresponding to the plurality of light tubes 508 of the optical structure 506. The optical device 510 is configured to focus the light exiting the optical structure 506, such that the light 514 transmitted via the optical device 510 is highly collimated light.

Figure 6:
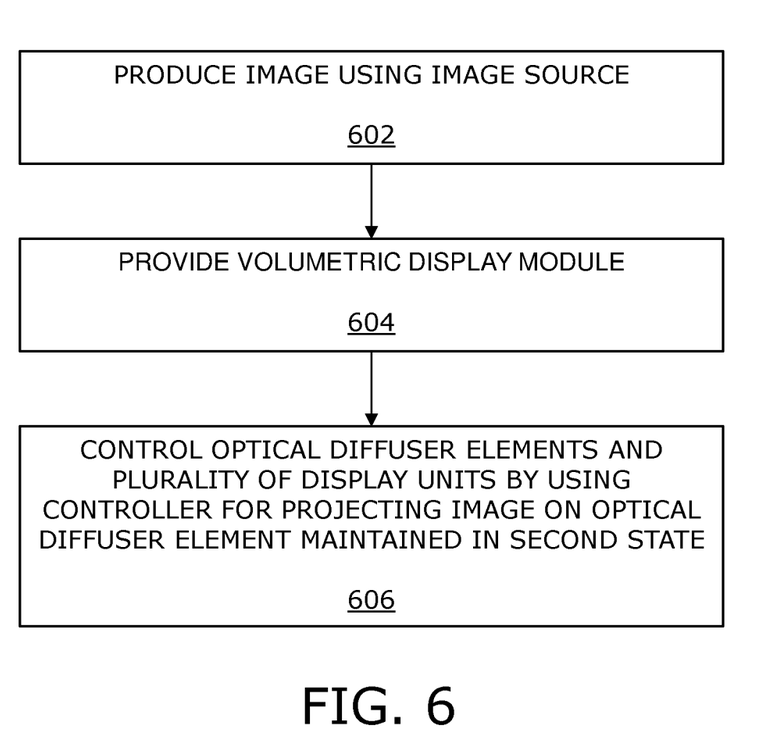
FIG. 6 is an illustration of steps of a method of operating an image display system, in accordance with an embodiment of the present disclosure.

Referring now to FIG. 6, there are shown steps of a method 600 of operating an image display system, in accordance with an embodiment of the present disclosure. At a step 602, an image is produced using an image source. The image source comprises a plurality of display units arranged in an array and each display unit of the plurality of display units is configured to emit collimated light for producing a pixel of the image. At a step 604, a volumetric display module is provided. The volumetric display module comprises a plurality of optical diffuser elements arranged in a stack and an optical diffuser element of the plurality of optical diffuser elements is maintained in a first state to allow incident light to pass through the optical diffuser element, or in a second state to allow scattering of incident light and projection of the image on the optical diffuser element. At a step 606, a controller is used to control an optical diffuser element of the plurality of optical diffuser elements to maintain the optical diffuser element in the second state, remaining optical diffuser elements of the plurality of optical diffuser elements to maintain the optical diffuser elements in the first state, and the plurality of display units to emit collimated light for projecting the image on the optical diffuser element maintained in the second state.

Modifications to embodiments of the present disclosure described in the foregoing are possible without departing from the scope of the present disclosure as defined by the accompanying claims. Expressions such as "including", "comprising", "incorporating", "have", "is" used to describe and claim the present disclosure are intended to be construed in a non-exclusive manner, namely allowing for items, components or elements not explicitly described also to be present. Reference to the singular is also to be construed to relate to the plural.

The invention claimed is:

1. An image display system comprising:
   —an image source for producing an image, wherein the image source comprises a plurality of display units arranged in an array and wherein each display unit of the plurality of display units is configured to emit collimated light for producing a pixel of the image;
   —a volumetric display module comprising a plurality of optical diffuser elements arranged in a stack, wherein an optical diffuser element of the plurality of optical diffuser elements is maintained in a:
     —first state to allow incident light to pass through the optical diffuser element, or
     —second state to allow projection of an image on the optical diffuser element by scattering of incident light; and
   —a controller operatively coupled to each of the image source and the volumetric display module, wherein the controller is configured to control:
     —an optical diffuser element of the plurality of optical diffuser elements to maintain the optical diffuser element in the second state,
     —remaining optical diffuser elements of the plurality of optical diffuser elements to maintain the optical diffuser elements in the first state, and
     —the plurality of display units to emit collimated light for projecting the image on the optical diffuser element maintained in the second state.

2. The image display system according to claim 1, wherein the image source is one of a laser diode-based array, a light emitting diode micro-display, a thin film transistor liquid-crystal display.

3. The image display system according to claim 1 further comprising an optical structure comprising a plurality of light tubes arranged in an array, wherein the optical structure is positioned between the image source and the volumetric display module, and wherein the plurality of light tubes corresponds to the plurality of display units of the image source.

4. The image display system according to claim 3, further comprising an optical device comprising a plurality of optical elements arranged in an array, wherein the optical device is positioned between the optical structure and the volumetric display module, and wherein the plurality of optical elements corresponds to the plurality of light tubes of the optical structure.

5. The image display system according to claim 1, further comprising an optical device comprising a plurality of optical elements arranged in an array, wherein the optical device is positioned between the image source and the volumetric display module, and wherein the plurality of optical elements corresponds to the plurality of display units of the image source.

6. The image display system according to claim 4 wherein each optical element of the plurality of optical elements is one of a microlens, a holographic microlens, a Fresnel microlens, a metamaterial microlens, a focus-tuneable microlens.

7. The image display system according to claim 1, wherein the image source comprises a plurality of light sources operatively coupled to a spatial light modulator.

8. The image display system according to claim 7, wherein the spatial light modulator is one of a transmissive-type spatial light modulator, or a reflective-type spatial light modulator.

9. The image display system according to claim 1, wherein the image source is configured to emit collimated light at an oblique angle with respect to a normal of a plane of the volumetric display module.

10. The image display system according to claim 9, wherein the oblique angle is 5-30°.

11. The image display system according to claim 9, wherein the oblique angle is 10-20°.

12. The image display system according to claim 1, wherein the volumetric display module is implemented to have a monolithic structure.

13. The image display system according to claim 1, wherein each of the image source, the volumetric display module and the controller are incorporated in a near-to-eye display device.

14. The image display system according to claim 13, further comprising at least one holographic grating arranged to be located between the volumetric display module and eyes of a wearer of the near-to-eye display device.

15. The image display system according to claim 1, further comprising at least one holographic grating arranged to be located between the light source and the volumetric display module.

16. A method of operating an image display system, the method comprising:
   —producing an image using an image source, wherein the image source comprises a plurality of display units arranged in an array and wherein each display unit of the plurality of display units is configured to emit collimated light for producing a pixel of the image;
   —providing a volumetric display module comprising a plurality of optical diffuser elements arranged in a stack, wherein an optical diffuser element of the plurality of optical diffuser elements is maintained in a:
     —first state to allow incident light to pass through the optical diffuser element, or
     —second state to allow scattering of incident light and projection of the image on the optical diffuser element;
   —controlling, using a controller:
     —an optical diffuser element of the plurality of optical diffuser elements to maintain the optical diffuser element in the second state, —remaining optical diffuser elements of the plurality of optical diffuser elements to maintain the optical diffuser elements in the first state, and —the plurality of display units to emit collimated light for projecting the image on the optical diffuser element maintained in the second state.

17. The method according to claim 16, wherein the image display system further comprises a plurality of focus-tuneable microlenses positioned between the image source and the volumetric display module, and wherein each of the plurality of focus-tuneable microlenses is operatively coupled to the controller, the method further comprising controlling, using the controller:

—an optical diffuser element of the plurality of optical diffuser elements to maintain the optical diffuser element in the second state, and —the plurality of focus-tuneable microlenses to focus the collimated light emitted from the image source onto the optical diffuser element maintained in the second state.

18. An image projecting device, wherein the image projecting device is configured to produce an image on an optical diffuser element of a volumetric display module, and wherein the image projecting device comprises:

—an image source comprising a plurality of display units arranged in an array, wherein each display unit of the plurality of display units is configured to emit collimated light for producing a pixel of the image; and —a controller operatively coupled to the image source, wherein the controller is configured to control the plurality of display units to emit collimated light for producing the corresponding pixel of the image on the optical diffuser element of the volumetric display module.

19. The image projecting device according to claim 18, wherein the image source is one of a laser diode-based array, a light emitting diode micro-display, a thin film transistor liquid-crystal display.

20. The image projecting device according to claim 18, further comprising an optical structure comprising a plurality of light tubes arranged in an array, wherein the optical structure is positioned between the image source and the volumetric display module, and wherein the plurality of light tubes corresponds to the plurality of display units of the image source.

21. The image projecting device according to claim 20, further comprising an optical device comprising a plurality of optical elements arranged in an array, wherein the optical device is positioned in an optical path of light transmitted through the optical structure, and wherein the plurality of optical elements corresponds to the plurality of light tubes of the optical structure.

22. The image projecting device according to claim 20, further comprising an optical device comprising a plurality of optical elements arranged in an array, wherein the optical device is positioned in an optical path of light between the image source and the volumetric display module, and wherein the plurality of optical elements corresponds to the plurality of display units of the image source.

23. The image projecting device according to claim 21, wherein each optical element of the plurality of optical elements is one of a microlens, a holographic microlens, a Fresnel microlens, a metamaterial microlens, a focus-tuneable microlens.

24. The image projecting device according to claim 18, wherein the image source comprises a plurality of light sources operatively coupled to a spatial light modulator.

25. The image projecting device according to claim 24, wherein the spatial light modulator is one of a transmissive-type spatial light modulator, or a reflective-type spatial light modulator.

* * * * *